United States Patent
Jo et al.

(10) Patent No.: US 11,197,285 B2
(45) Date of Patent: Dec. 7, 2021

(54) METHOD FOR TRANSMITTING OR RECEIVING SIGNAL IN WIRELESS COMMUNICATION SYSTEM, AND APPARATUS THEREFOR

(71) Applicant: LG Electronics Inc., Seoul (KR)

(72) Inventors: Soonki Jo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/637,557

(22) PCT Filed: Aug. 7, 2018

(86) PCT No.: PCT/KR2018/008962
§ 371 (c)(1),
(2) Date: Feb. 7, 2020

(87) PCT Pub. No.: WO2019/031813
PCT Pub. Date: Feb. 14, 2019

(65) Prior Publication Data
US 2020/0245301 A1  Jul. 30, 2020

Related U.S. Application Data

(60) Provisional application No. 62/541,786, filed on Aug. 7, 2017.

(51) Int. Cl.
*H04W 72/04* (2009.01)
(52) U.S. Cl.
CPC ................. *H04W 72/042* (2013.01)
(58) Field of Classification Search
CPC .................................................. H04W 72/042
See application file for complete search history.

(56) References Cited

U.S. PATENT DOCUMENTS

2016/0295558 A1   10/2016  Hussain et al.
2018/0309560 A1*  10/2018  Tang ..................... H04L 5/0094
2019/0020506 A1*   1/2019  Cheng ..................... H04L 25/02

FOREIGN PATENT DOCUMENTS

KR     20140125830    10/2014
KR     20150040979    4/2015
WO     WO2013066122   5/2013

OTHER PUBLICATIONS

PCT International Search Report and Written Opinion in International Application No. PCT/KR2018/008962, dated Nov. 12, 2018, 16 pages (with English translation).

(Continued)

*Primary Examiner* — Ronald B Abelson
(74) *Attorney, Agent, or Firm* — Fish & Richardson P.C.

(57) ABSTRACT

A method by which a terminal receives downlink control information in a wireless communication system, according to one aspect of the present invention, comprises the steps of: receiving configurations for a plurality of control resource sets (CORESETs); monitoring control channel candidates in at least one among user equipment-specific search spaces (USSs) and common search spaces (CSSs), which are configured in the plurality of CORESETs; and acquiring control information by monitoring the control channel candidates, wherein the terminal can determine the location of each of the USSs by using specific parameters with respect to each of the plurality of CORESETs to which each of the USSs belongs. The terminal is capable of communicating with at least one of another terminal, a terminal related to an autonomous driving vehicle, a base station or a network.

15 Claims, 5 Drawing Sheets

| AL8 | AL8 | AL4 | AL4 |

(a) Disposed by starting with high AL

| AL4 | AL4 | AL8 | AL8 |

(b) Disposed by starting with low AL

| AL8 | AL4 | AL8 | AL4 |

(c) Disposed sequentially in descending

| AL4 | AL8 | AL4 | AL8 |

(d) Disposed sequentially in ascending

(56) References Cited

OTHER PUBLICATIONS

NTT Docomo, Inc., "Open issues list and comments for AI 7.1.3.1," Rl-1709386, 3GPP TSG-RAN WG1 #89, Hangzhou, P.R. China, dated May 15-19, 2017, 6 pages.

\* cited by examiner

METHOD FOR TRANSMITTING OR RECEIVING SIGNAL IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2018/008962, filed on Aug. 7, 2018, which claims the benefit of U.S. Provisional Application No. 62/541,786, filed on Aug. 7, 2017. The disclosures of the prior applications are incorporated by reference in their entirety.

TECHNICAL FIELD

The present disclosure relates to a wireless communication system, and more particularly, to a method of transmitting or receiving a downlink signal and apparatus therefor.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Task

One technical task of the present disclosure is to provide a method of transmitting/receiving downlink control information and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one technical aspect of the present disclosure, provided herein is a method of receiving a downlink control information by a user equipment in a wireless communication system, the method including receiving configurations for a multitude of Control Resource Sets (CORESETs), monitoring control channel candidates in at least one of User equipment-specific Search Spaces (USSs) and Common Search Spaces (CSSs) configured for a multitude of the CORESETs, and obtaining a control information through the monitoring of the control channel candidates, wherein the user equipment may determine locations of the USSs using parameters specific to a multitude of the CORESETs to which the USSs belong, respectively.

In another technical aspect of the present disclosure, provided herein is a user equipment in receiving a downlink control information in a wireless communication system, the user equipment including a transceiver and a processor configured to receive configurations for a multitude of Control Resource Sets (CORESETs) through the transceiver, monitor control channel candidates in at least one of User equipment-specific Search Spaces (USSs) and Common Search Spaces (CSSs) configured for a multitude of the CORESETs, and obtain a control information through the monitoring of the control channel candidates, wherein the user equipment may be further configured to determine locations of the USSs using parameters specific to a multitude of the CORESETs to which the USSs belong, respectively.

The user equipment may determine the locations of the USSs respectively using an index $C_k$ of a corresponding CORESET in a slot k and a cell- or user equipment group-specific constant.

A multitude of control channel candidates having different aggregation levels in each of the CSSs may be consecutively disposed without overlapping with each other and disposition order of a multitude of the control channel candidates in each of the CSSs may be determined based on aggregation levels. For example, a multitude of the control channel candidates may be disposed in order of a higher aggregation level or a lower aggregation level.

Alternatively, a multitude of control channel candidates having different aggregation levels in each of the CSSs may be inconsecutively disposed and each CORESET to which each CSS belongs may be divided into a multitude of sub-CORESETs. For one example, a single control channel candidate may be assigned to each of a multitude of the sub-CORESETs and each of the control channel candidates may be disposed at a front, tail, middle or prescribed offset applied location in each of the sub-CORESETs. For another example, a multitude of the sub-CORESETs may be related to different aggregation levels, respectively.

Advantageous Effects

According to one embodiment of the present disclosure, since a location of a USS is determined CORESET-specifically in an environment that a multitude of CORESETs are configured for a user equipment, downlink control information may be transceived without interference or overlapping between USSs.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR DISCLOSURE

Figure 1:
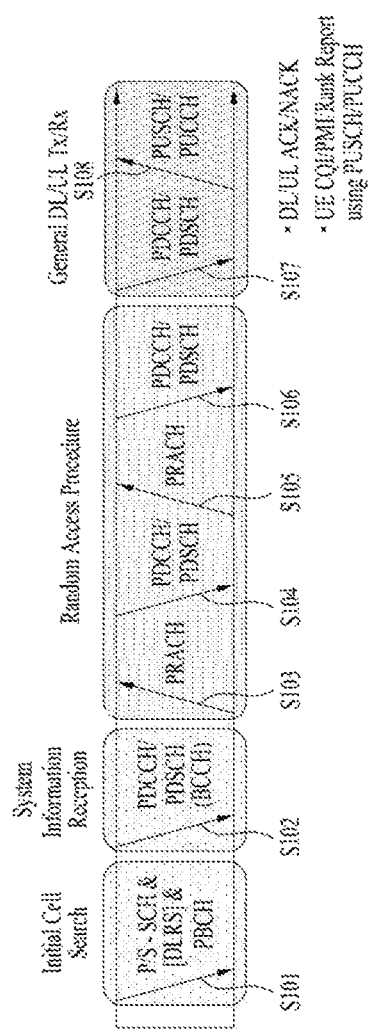
FIG. 1 is an exemplary diagram illustrating physical channels used in a 3rd Generation Partnership Project (3GPP) Long Term Evolution/Long Term Evolution-Advanced (LTE/LTE-A) system, and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

NR Frame Structure and Physical Resource

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

As such, in an NR system, the number of slots included in 1 subframe may be variable depending on subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

NR DL Control Channel

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station may signal information on a CORESET to a UE. For example, a CORESET configuration for each CORESET and time duration (e.g., 1/2/3 symbol) of the corresponding CORESET may be signaled. When interleaving for distributing a CCE to 1 symbol-CORESET is applied, 2 or 6 REGs may be bundled. Bundling of 2 or 6 REGs may be performed on 2 symbol-CORESET and time-first mapping may be applied. Bundling of 3 or 6 REGs may be performed on 3 symbol-CORESET and time-first mapping may be applied. When REG bundling is performed, the UE may assume the same precoding with respect to a corresponding bundling unit.

Search Space

Common Search Space (CSS)

Control channel candidates configuring a CSS may be disposed consecutively (e.g., consecutive CSS) or inconsecutively (e.g., distributed CSS).

Consecutive CSS

For example, all candidates required for CSS configuration may be disposed in a row. ALs of candidates included in CSS are set and candidates of each AL may be disposed in CORESET. In disposing candidates configuring CSS, the candidates may be disposed consecutively with each other. Regarding the disposed order of candidates in CSS, candidates of the highest AL are first disposed in a row and candidates of a next higher AL are then disposed in a row [e.g., FIG. 2 (a)]. On the contrary, CSS may be configured in order of disposing candidates of the lowest AL first and then disposing candidates of a next lower AL [e.g., FIG. 2 (b)]. Alternatively, candidates of each AL may be sequentially disposed in descending order [e.g., FIG. 2 (c)] or in ascending order [e.g., FIG. 2 (d)]. Alternatively, candidates may be disposed in a row in a manner of being randomly mixed.

Figure 2:
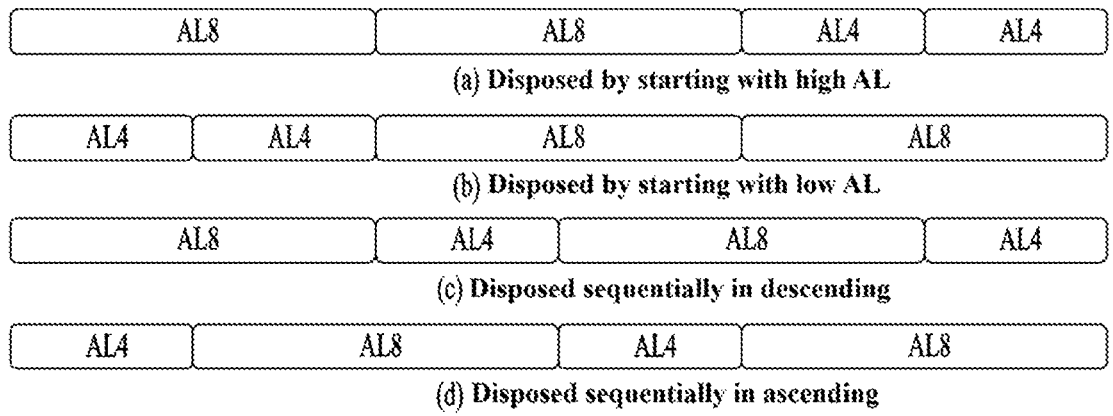
FIG. 2 is a diagram showing one embodiment of a consecutive CSS configuring method.

FIG. 2 is a diagram showing one embodiment of a consecutive CSS configuring method.

In FIG. 2, an environment of using a search space and PDCCH format defined in the current LTE-A is assumed. ALs used in CSS are 8 and 4, and the number of candidates per AL is 2 each.

Distributed CSS

In case of disposing candidates inconsecutively, it is difficult to dispose candidates of CSS randomly like USS. As common control information is carried on CSS, since the corresponding common control information needs to be seen by a multitude of UEs, a CSS location should be known to all the UEs that need the corresponding common control information. Therefore, for inconsecutive CSS candidate disposition, it is necessary to define some rules.

(1) Inconsecutive CSS disposing method 1: The entire region of CORESET is divided into sub-CORESET regions as many as the CSS candidate number, and a single CSS candidate may be disposed in a single sub-CORESET region. A location of a candidate disposed in each sub-CORESET may be agreed in advance as the head of the sub-CORESET region, the tail of the sub-CORESET region, the middle of the sub-CORESET region, a location having a determined offset value in the sub-CORESET region, etc.

(2) Inconsecutive CSS disposing method 2: The region of CORESET may be divided into sub-CORESET regions as many as the AL number of CSS. For example, if AL 8 and AL 4 are used in CSS, the CORESET region may be mainly divided into two. Candidates for a single AL may be disposed in each sub-CORESET region. In doing so, the candidates for the single AL may be disposed consecutively or inconsecutively. When the same AL candidates are disposed consecutively, they may be disposed at the head of the sub-CORESET region, the tail of the sub-CORESET region, the middle of the sub-CORESET region, a location having a determined offset value in the sub-CORESET region, etc. When the same AL candidates are disposed inconsecutively, one sub-CORESET is divided into sub-sub CORESETs as many as the number of candidates of the corresponding AL and it may be defined that a single candidate is disposed per sub-sub CORESET like the disposing method 1. And, the disposed locations may include the head of the sub-sub CORESET, the tail of the sub-sub CORESET, the middle of the sub-sub CORESET, a location having a determined offset value in the sub-sub CORESET, etc.

(3) Inconsecutive CSS disposing method 3: CSS is disposed across CORESET in the above two methods (1) and (2). Yet, in the method 3, a CORESET region for disposing CSS therein is preset and CSS may be configured in the preset region by the disposing method 1 or 2. The region in CORESET for CSS may be defined as the head of the whole CORESET, the tail of the whole CORESET, the middle of the whole CORESET, a location having a determined offset value in the whole CORESET, etc.

(4) Inconsecutive CSS disposing method 4: Bundles, each of which has one candidate of each AL, are prepared, sub-CORESETs are configured as many as the number of the corresponding bundles, and candidates may be disposed therein. If the number of candidates differs per AL, bundles (e.g., N bundles) are first configured with reference to an AL having the smallest number of candidates (e.g., N candidates) and the remaining AL candidates may be then assigned to the respective bundles one by one. In doing so, the disposing method 1, 2 or 3 may apply to the bundle disposition in each sub-CORESET.

Figure 3:
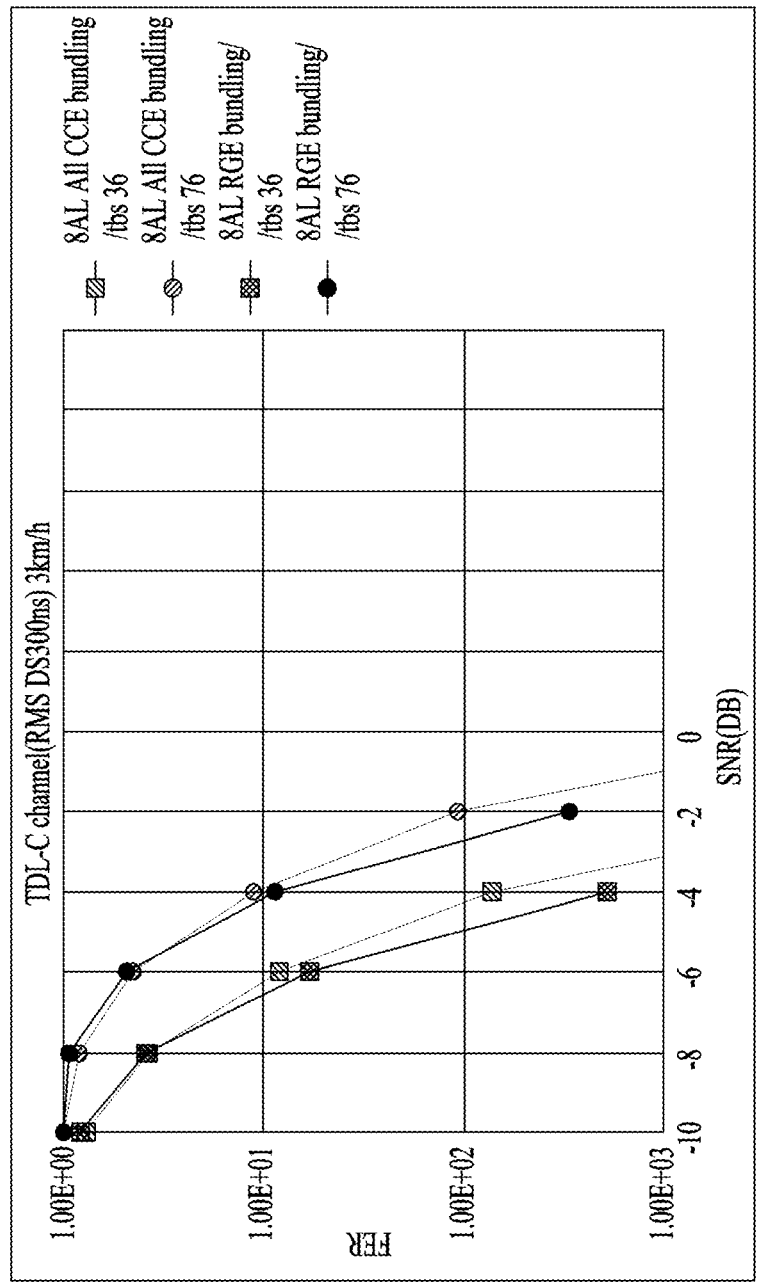
FIG. 3 is a diagram to describe FER performance according to a bundling size.

FIG. 3 shows Frame Error Rate (FER) performance in case of performing REG bundling in a single CCE size and FER performance in case of bundling all CCEs, for a single AL 8 candidate. In case of the bundling in CCE size, a method of disposing a candidate at the head of each sub-CORESET in the disposing method 1 is applied.

Referring to FIG. 3, it may be observed that FER performance in case of performing REG bundling in a single CCE size is better than and FER performance in case of bundling all CCEs.

UE-Specific Search Space (USS)

Multi-USS in Multi-CORESET

A single UE may have a multitude of CORESETs configured therefor. In case that a UE has a multitude of CORESETs, USS may be defined per CORESET. In this case, a different hashing point of the USS may be defined per CORESET.

For example, although a hashing function for USS is similar to that of the existing LTE, a hashing point of USS may be defined different per CORESET. By the hashing function, locations of candidates of the USS may be defined. In this case, a hashing function may be defined in a manner that a hashing point different per CORESET may be derived by applying specific information (e.g., CORESET index, etc.) unique to the corresponding CORESET to the hashing function of determining the hashing point.

Formula 1 in the following is a hashing function of a search space in LTE.

$$L\left\{(Y_k+m) \bmod \left\lfloor \frac{N_{CCE,k}}{L} \right\rfloor \right\}+i \quad \text{[Formula 1]}$$

In Formula 1, L means an Aggregation Level (AL), m is an integer in a range of 0 to $(M^{(L)}-1)$, M(L) means the number of candidates of the AL L that should be monitored by a UE in a corresponding search space, and i is an integer in a range of 0 to (L−1). In case of CSS, $Y_k=0$ is defined. In case of USS, $Y_k=(A*Y_{k-1}) \bmod D$ is defined. In case of LTE, A is 39827. In case of LTE, D is 65537. And, $Y_{-1}=n_{RNTI}$ (e.g., a value necessary for subframe 0) is defined. the $n_{RNTI}$ may be an identifier (e.g., radio network temporary identifier) assigned to a UE.

Regarding a factor for determining a hashing point in Formula 1, $Y_k$ plays a great role in changing a hashing point per subframe.

Therefore, according to one embodiment of the present disclosure, by redefining $Y_k$, a hashing function of outputting a different hashing point per CORESET is defined. For example, by additionally applying two kinds of parameters in $Y_k=(A*Y_{k-1}) \bmod D$, new $Y_k'$ may be defined. A CORESET index in slot k is defined as $C_k$, and a per-cell or -group constant, by which $C_k$ is multiplied, is defined as r. $Y_k'$ may be defined as Formula 2.

$$Y_k'=(r*C_k*A*Y_{k-1}) \bmod D = (A'*Y_{k-1}) \bmod D \quad \text{[Formula 2]}$$

$$A'=r*C_k*A$$

Referring to Formula 2, although a new variable $C_k$ and a constant r is added to Formula 1, Formula 2 has complexity almost similar to that of the hashing function of the existing LTE. Thus, the hashing function according to Formula 2 has the complexity almost similar to that of the hashing function of the existing LTE and USS of each CORESET may have a different hashing point.

Search Space With Multiple TRP/Cell

When a UE is connected to several TRPs/cells and data is transmitted via a multitude of TRPS/cells, a method of delivering control information on the corresponding data to a UE is important.

Search Space Allocation for Multiple TRP/Cell

When a single UE is connected to a multitude of TRPs/cells, a search space may be configured for a single TRP/cell, a search space may be configured for each TRP/cell, or a search space may be configured for some TRPs/cells only.

Regarding a search space configuring method of each TRP/cell, a method applied when a UE is connected to a single TRP/cell is applicable identically, or a whole search space that a UE may have may be configured in a manner of being divided for TRPs/cells.

Alternatively, a search space per TRP/cell may be configured in a manner of being divided per AL of a search space. For example, if ALs configured for a search space are 8 and 4, a search space configured for one TRP/cell may have AL 8 only and another TRP/cell may have a search space for AL 4 only. If the number of the connected TRPs/cells is greater than the number of ALs, there may be a TRP/cell failing to have a search space.

Multiple TRP/Cell in Same Band

When UE-connected TRPs/cells use the same band, a method of configuring a CSS is necessary. If CSSs of TRPs/cells are configured in the same resource region, there may exist inter-CSS interference.

(1) Offset application: for example, CSSs may be configured not to overlap with each other in a manner that a resource location configuring a CSS of each TRP/cell has an offset value per TRP/cell. The offset value may be defined by higher layer signaling.

(2) Interleaving application: for another example, interleaving may be applied to a CSS of each TRP/cell like a USS. For the interleaving, TRP/cell ID, virtual ID and the like may be used. As a result of the interleaving, resources of different CSSs may overlap with each other in part. Yet, considering the attribute of the random interleaving, probability of inter-CSS overlapping is not high.

Figure 4:
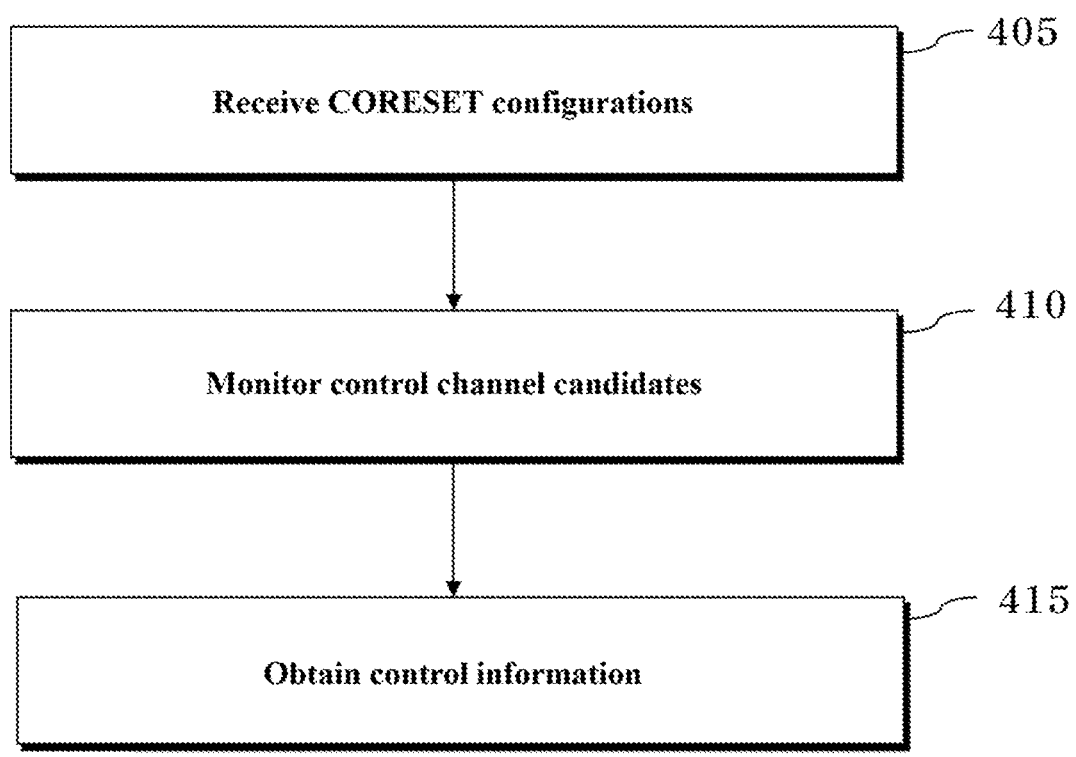
FIG. 4 is a flowchart of a method of transceiving a downlink signal according to one embodiment of the present disclosure.

FIG. 4 is a flowchart of a method of transceiving a downlink signal according to one embodiment of the present disclosure. FIG. 4 is the exemplary implementation for the above-described embodiments, by which the scope of the appended claims and their equivalents is non-limited. And, the aforementioned contents may be referred to for FIG. 4.

A UE may receive configurations for a multitude of Control Resource Sets (CORESETs) [405].

The UE may monitor control channel candidates in at least one of UE-specific Search Spaces (USS) and Common Search Spaces (CSSs), which are configured for a multitude of the CORESETs [410].

The UE may obtain control information through the monitoring of the control channel candidates [415].

In some implementations, the UE may determine locations of the USSs using specific parameters specified for a multitude of the CORESETs to which the USSs belong, respectively. For example, the UE may determine the respective locations of the USSs using an index $C_k$ of the corresponding CORESET in a slot k and a cell-specific constant or a UE group-specific constant [e.g., Formula 2].

A plurality of the control channel candidates having different aggregation levels in each of the CSSs may be consecutively disposed without overlapping with each other, and the disposition order of a multitude of the control channel candidates in each CSS may be determined based on the aggregation levels. For example, a multitude of the control channel candidates may be disposed in order of higher or lower levels.

Alternatively, A plurality of the control channel candidates having different aggregation levels in each of the CSSs may be inconsecutively disposed, and each CORESET to which each CSS belongs may be divided into a multitude of sub-CORESETs. For one example, a single control channel candidate is assigned to each of a multitude of the sub-CORESETs, and each control channel candidate may be disposed at the front, tail, middle or prescribed-offset applied location in each sub-CORESET. For another example, a multitude of the sub-CORESETs may correspond to different aggregation levels, respectively.

Figure 5:
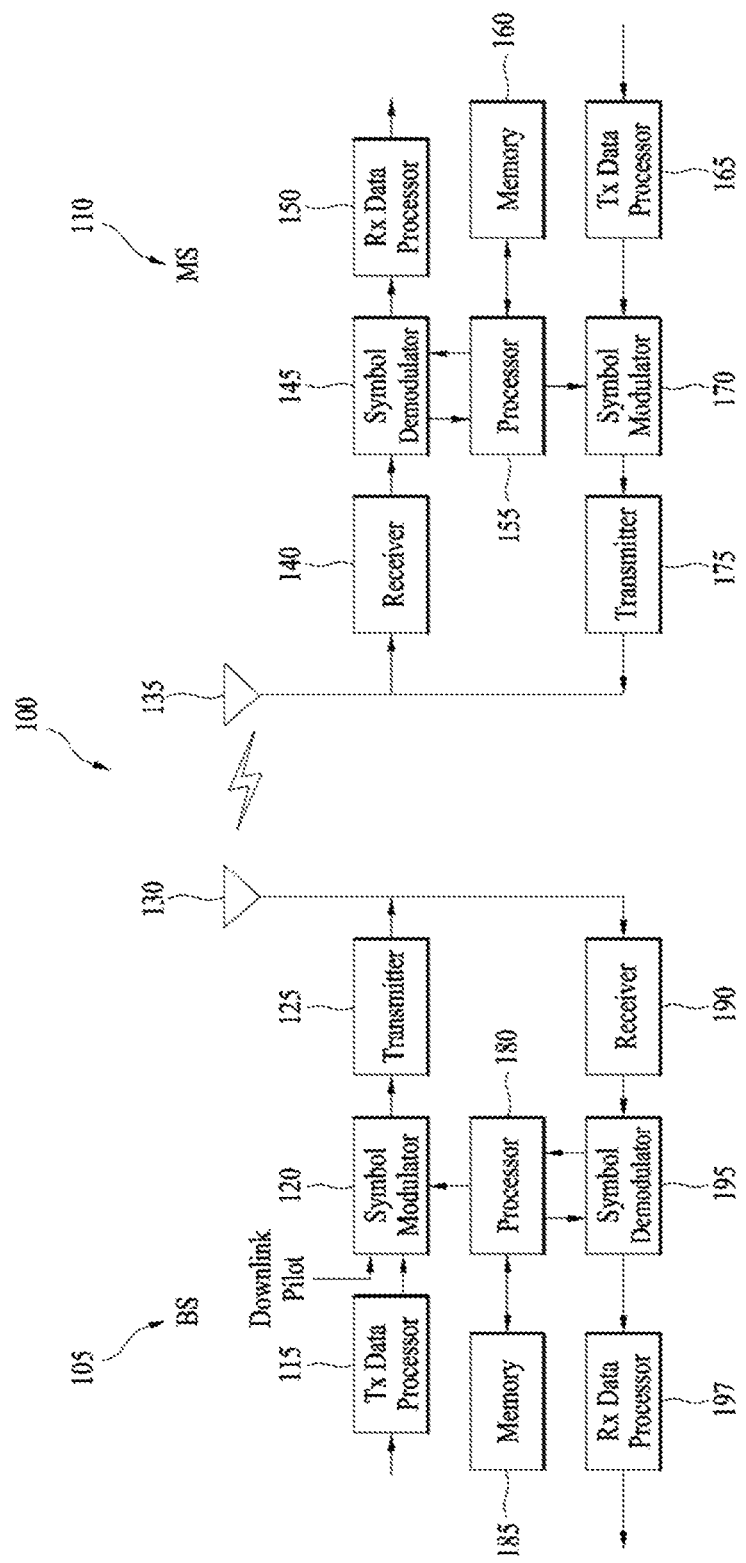
FIG. 5 is a block diagram of a User Equipment (UE) and a Base Station (BS) according to an embodiment of the present invention.

FIG. 5 is a block diagram illustrating a structure of a Base Station (BS) 105 and a User Equipment (UE) 110 in a wireless communication system 100 according to an embodiment of the present disclosure. The BS 105 may be referred to as an eNB or a gNB. The UE 110 may be referred to a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

As described above, the present disclosure may be applied to various wireless communication systems.

What is claimed is:

1. A method of receiving a downlink control information by a user equipment in a wireless communication system, the method comprising:
   receiving configurations for a multitude of Control Resource Sets (CORESETs);
   monitoring control channel candidates in at least one of User equipment-specific Search Spaces (USSs) and Common Search Spaces (CSSs) configured for the multitude of the CORESETs; and
   obtaining a control information through the monitoring of the control channel candidates,
   wherein the user equipment determines locations of the USSs using parameters specific to the multitude of the CORESETs to which the USSs belong, respectively.

2. The method of claim 1, wherein the user equipment determines the locations of the USSs respectively using an index $C_k$ of a corresponding CORESET in a slot k and a cell -or user equipment group-specific constant.

3. The method of claim 1, wherein a multitude of control channel candidates having different aggregation levels in each of the CSSs are consecutively disposed without overlapping with each other and wherein disposition order of the multitude of the control channel candidates in each of the CSSs is determined based on aggregation levels.

4. The method of claim 3, wherein the multitude of the control channel candidates are disposed in order of a higher aggregation level or a lower aggregation level.

5. The method of claim 1, wherein a multitude of control channel candidates having different aggregation levels in each of the CSSs are inconsecutively disposed and wherein each CORESET to which each CSS belongs is divided into a multitude of sub-CORESETs.

6. The method of claim 5, wherein a single control channel candidate is assigned to each of the multitude of the sub-CORESETs and wherein each of the control channel candidates is disposed at a front, tail, middle or prescribed offset applied location in each of the sub-CORESETs.

7. The method of claim 5, wherein the multitude of the sub-CORESETs are related to different aggregation levels, respectively.

8. A user equipment in receiving a downlink control information in a wireless communication system, the user equipment comprising:
   a transceiver; and
   a processor configured to receive configurations for a multitude of Control Resource Sets (CORESETs) through the transceiver, monitor control channel candidates in at least one of User equipment-specific Search Spaces (USSs) and Common Search Spaces (CSSs) configured for the multitude of the CORESETs, and obtain a control information through the monitoring of the control channel candidates, wherein the user equipment is further configured to determine locations of the USSs using parameters specific to the multitude of the CORESETs to which the USSs belong, respectively.

9. The user equipment of claim 8, wherein the processor determines the locations of the USSs respectively using an index $C_k$ of a corresponding CORESET in a slot k and a cell- or user equipment group-specific constant.

10. The user equipment of claim 8, wherein a multitude of control channel candidates having different aggregation levels in each of the CSSs are consecutively disposed without overlapping with each other and wherein disposition order of the multitude of the control channel candidates in each of the CSSs is determined based on aggregation levels.

11. The user equipment of claim 10, wherein the multitude of the control channel candidates are disposed in order of a higher aggregation level or a lower aggregation level.

12. The user equipment of claim 8, wherein a multitude of control channel candidates having different aggregation levels in each of the CSSs are inconsecutively disposed and wherein each CORESET to which each CSS belongs is divided into a multitude of sub-CORESETs.

13. The user equipment of claim 12, wherein a single control channel candidate is assigned to each of the multitude of the sub-CORESETs and wherein each of the control channel candidates is disposed at a front, tail, middle or prescribed offset applied location in each of the sub-CORESETs.

14. The user equipment of claim 12, wherein the multitude of the sub-CORESETs are related to different aggregation levels, respectively.

15. The user equipment of claim 8, wherein the user equipment is capable of communicating with at least one of another user equipment, a user equipment related to an autonomous driving vehicle, a base station or a network.

* * * * *